April 28, 1959          A. B. TAYLOR          2,884,614
TERMINAL BLOCKS FOR ELECTRICAL TROLLEY SYSTEMS
Filed Sept. 17, 1953          2 Sheets-Sheet 1
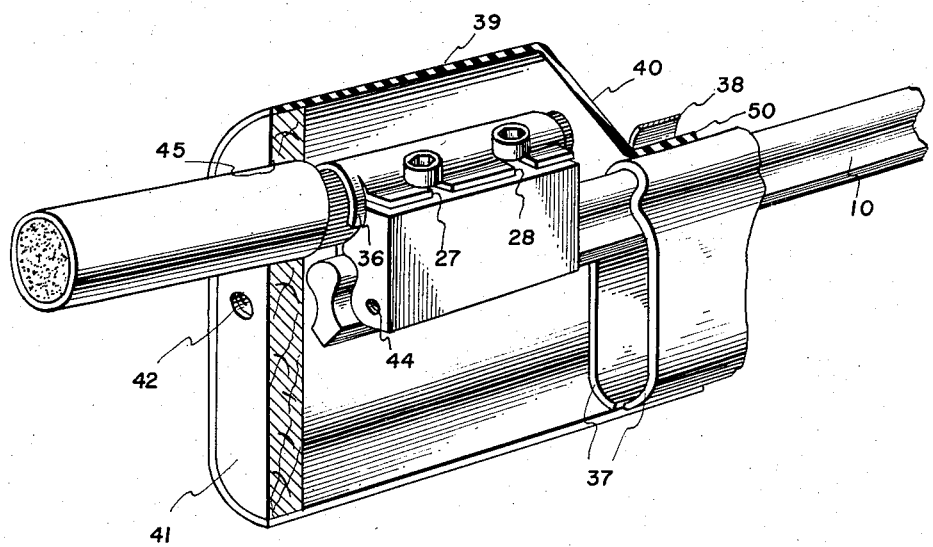
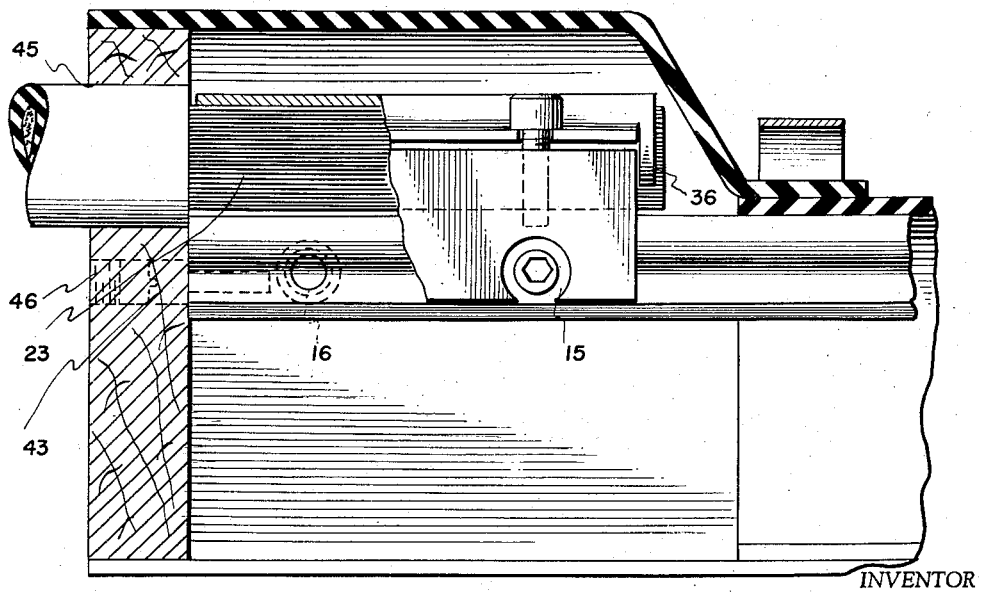
INVENTOR
ASHTON B. TAYLOR
BY *Smith, Michael & Gardner*
ATTORNEYS.

April 28, 1959     A. B. TAYLOR     2,884,614
TERMINAL BLOCKS FOR ELECTRICAL TROLLEY SYSTEMS
Filed Sept. 17, 1953     2 Sheets-Sheet 2
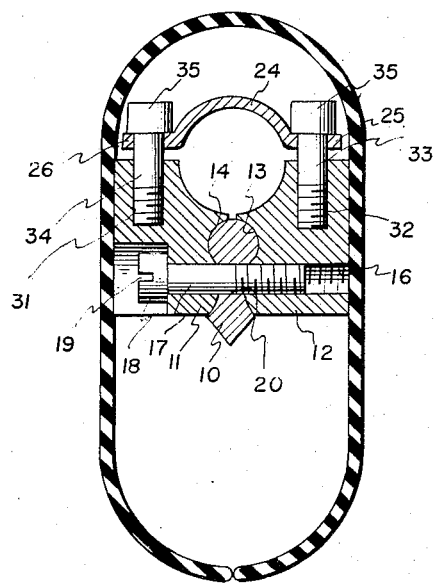
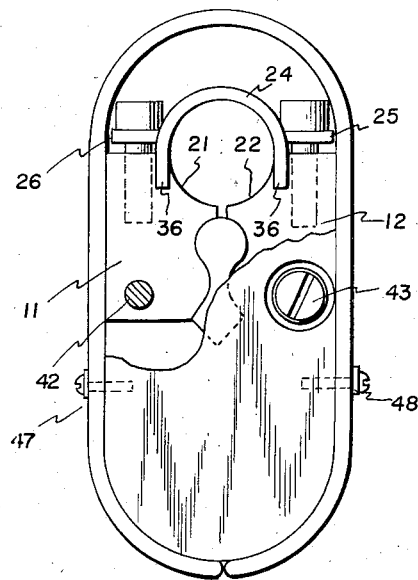
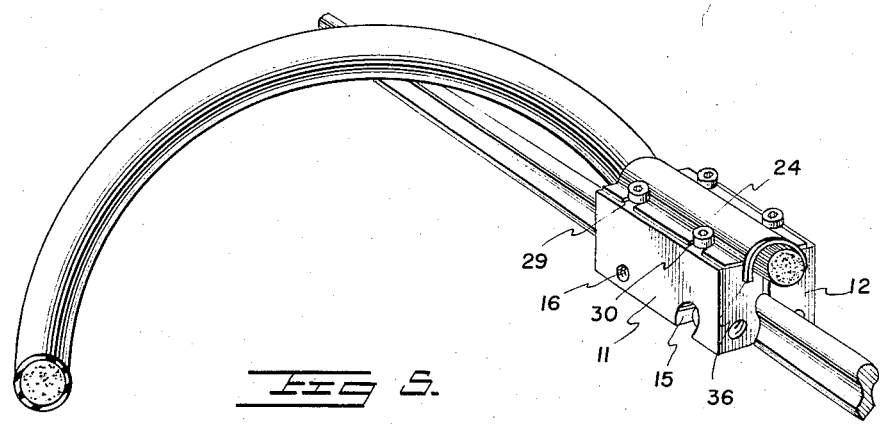
INVENTOR
ASHTON B. TAYLOR
BY *Smith, Michael & Jardinier*
ATTORNEYS.

United States Patent Office 2,884,614
Patented Apr. 28, 1959

2,884,614

TERMINAL BLOCKS FOR ELECTRICAL TROLLEY SYSTEMS

Ashton B. Taylor, Pittsburgh, Pa.

Application September 17, 1953, Serial No. 380,644

4 Claims. (Cl. 339—263)

This invention relates to a terminal block for electrical trolley systems in which the trolley conductors comprise rigid conductor bars with which a collector shoe cooperates for the purpose of transmitting electric energy to remote points.

More particularly, the invention relates to a conductor bar terminal by means of which the bar is connected to a power cable for transmitting such power throughout the length of the bar.

A primary object of the present invention is to provide a connection between the conductor bar and power cable so that the connection covers a substantial area of the bus bar at the point of connection to insure good contact and insure full transmission of power to the bar.

Another object is to provide a connection between the bar and power cable that is extremely firm and rigid so that vibrations and the like will not affect the connection or lessen its contact with the bar or cable.

Another object is to provide connecting members between the bar and power cable that are shaped to conform to the exterior contour of the bar so that when clamped in position, the members intimately embrace and snugly engage the bar throughout three sides thereof.

A further object is to provide connecting members between the bar and power cable in which the power cable is firmly engaged by said connecting members and is completely surrounded by said members to insure perfect contact between said members and the power cable.

Still another object is to provide connecting members on opposite sides of the bar that are of identical shape so that in assembling the same, the members can be used on one side or the other, thereby eliminating any unusual skill or care in making the connection.

An additional object is to provide a connection between the bar and power cable which is composed of a minimum number of parts, and which, therefore, can be cheaply made, readily installed by unskilled labor and which is rigid and sturdy to the extent of being practically indestructible.

And another object is to provide a connection that is completely shielded to prevent accidental contact with the power cable or bar at the point of connection.

Other objects and advantages will be apparent as the description proceeds, it being understood that changes may be resorted to as long as they do not depart from the spirit and scope of the appended claims.

Referring now to the drawings forming part hereof and in which similar numerals are used throughout the views:

Fig. 1 is a fragmentary perspective view of my invention with the shield and end block broken away to more clearly show the connection, Fig. 2 is a fragmentary side elevation partially in section, Fig. 3 is a transverse sectional view, Fig. 4 is an end elevation with the end block broken away to more clearly show the construction, and Fig. 5 illustrates an adaptation of my invention to a conductor bar when used as a booster or feeder tap.

By referring to the drawings, it will be seen that the present invention relates to a terminal block for an electrical trolley system in which the trolley conductor is in the form of a bar 10 which in the trade has a cross sectional contour such that it is known as a figure 8 bar, as is clearly shown in the drawing, except that the lower edge of the bar is provided with converged flat faces which are adapted to cooperate with a sliding shoe collector having a complemental groove therein to snugly engage the converged faces of the bar.

In order to transmit electrical energy from the source of power to the bar, there is provided a connection which consists of two identically shaped blocks 11 and 12. These blocks are preferably of copper, although they may be made of any good conducting material, and as shown, they are extruded and cold drawn, so that they form dense solid masses.

The blocks 11 and 12 are provided on their inner meeting faces with recesses 13 and 14 which correspond in shape with the sides and head portion of the bar. Consequently, when these blocks 11 and 12 are positioned on opposite sides of the bar 10 and drawn together, it will be seen that the inner faces of the blocks intimately and snugly embrace the bar throughout substantially all of the area of the bar at the point of connection. By this construction, a full and complete contact is made between the bars throughout the length of the block.

Each block is provided with horizontal openings 15 and 16 extending therethrough.

As seen from Figures 2 and 5, the opening 15 is enlarged at the face of the block for the reception of a threaded bolt 17, the head 18 of the bolt lying within the enlargement, and having a kerf 19 therein for the reception of a screw driver for use in clamping the connecting blocks together. The bolt 17 likewise passes through an opening 20 in the bar, and is threaded into the opening 16 lying in the block on the opposite side of the bar so that by operating the bolt 17, it is obvious that the two blocks 11 and 12 will tightly squeeze the bar on opposite sides thereby insuring very firm contact between the blocks and the bar.

As shown in Figure 5, the enlargement of the opening 15 is at the forward end of the block 11 and the opening 16 is at the rear end of the block. In the block 12, the positions of the openings are reversed, the enlargement of the opening 15 being at the rear of the block 12 in alignment with the opening 16 in the opposite block, and the small opening being at the forward end of the block in alignment with the enlarged opening in the opposite block.

At the meeting faces of the blocks 11 and 12 at the upper portion thereof, and extending throughout the length of the blocks are circular grooves 21 and 22 which when the blocks 11 and 12 are clamped together against the sides of the bar 10, form a semi-circular groove for the reception of the end of the power cable.

The bared end of the power cable 23 is inserted in the groove, and securely clamped in place by a semi-circular cable clamp 24 having horizontally extending ears 25 and 26 extending lengthwise thereof, and provided with slots 27, 28, 29 and 30 extending through the edge of the horizontal ears 26.

The blocks 11 and 12 are also provided with vertically extending threaded bores 31 and 32 for the reception of cap screws 33 and 34 which pass through the slots 27, 28, 29 and 30, and the heads of which engage the ears 25 and 26.

The cap screws are provided with sockets 35 for the reception of a wrench the means by which the cable clamp may be forced downwardly into engagement with the bared end 23 of the power cable and thereby squeeze the same into firm engagement with the grooves 21 and 22 in the blocks 11 and 12.

The cable clamp 24 is also provided at its opposite ends with depending ears 36 lying on opposite sides of the cable and extending downwardly over the ends of the blocks 11 and 12, so as to prevent longitudinal shifting of the cable clamp relative to the blocks.

By providing the ears 36, it will be evident that the positioning of the cable clamp on the blocks 11 and 12, so that the slots 27, 28, 29 and 30 align with the vertical bores 31 and 32 is facilitated, and that no special skill is required in assembling the connection.

In view of the fact that the blocks 11 and 12 are identical in construction, it is obvious that it makes no difference which block is placed on which side of the bus bar, and, consequently, unskilled labor can be utilized in making the installations required.

In trolley systems of this type, it is common to shield the bar to prevent exposure of the "live parts" and as shown, the shield consists of an insulating casing such as neoprene, Koroseal or the like, which is shaped to conform to the contour of the bar at its upper end and which is provided with depending portions 37 which are spaced apart slightly at their lower ends to receive the sliding shoe, and which are flexible to permit the shield to open as the shoe moves along the bar, but which return to substantially closed position after the shoe has passed along the bar.

These shields are held on the bar by means of spring clips 38 which surround the same, and embrace opposite sides of the bar, as shown in my prior applications.

In order to shield the connection, the present invention embodies a neoprene shield 39 which surrounds the blocks 11 and 12 and the cable clamp 24. The neoprene shield has a reduced end portion 40, and an extending sleeve 50 which lies on top of the shield for the bar, and is clamped thereto by the spring clip 38.

At the forward end of the shield 39 as shown in Figure 1 there is provided an insulating end cap 41 which may be made of Micarta or other suitable insulating substance that is rigid in character and the end cap 41 is provided with apertures 42 for the reception of headed bolts 43 which extend therethrough and are received in openings 44 in the ends of the blocks 11 and 12.

In this way, the end cap is secured within the shield 39 and closes the forward end thereof, the shield being provided with an opening 45 through which the power cable extends for reception between the clamping blocks and cable clamp. The openings 42 are closed by plugs 46 and the shield 39 is likewise secured to the end cap 41 by means of screws 47 and 48 which pass through the shield and are threaded into the end cap 41.

In Figure 5, it will be seen that the same blocks 11 and 12 are employed as well as the cable clamp, but in this instance, the connection is for the purpose of connecting the feeder or booster cable to the bar at any point along the length of the bus bar run, and in this adapation, the end cap is unnecessary, and is eliminated, but it is to be understood that the connection of Figure 5 is shielded by a shield 39, wherein both ends of the shield will be reduced and secured to the shield for the bar as indicated at the right-hand side of Figure 2.

From the above, it will be seen that the shield 39 is completely closed, and that it overlaps the shield which surrounds the bar with the result that all live parts are protected and any danger of injury eliminated.

It is obvious from the description that the present invention provides an exceedingly efficient and simple connection between the power cable and the conductor bar, that it may be cheaply made and quickly and easily installed by unskilled labor, and that it is so rigid and sturdy in its construction that there is little or no possibility of damage to any of its parts. Furthermore, that due to the fact that the cable blocks mate perfectly with the bar, perfect contact is made between the blocks and bar over a substantial area of the bar at the point of connection so as to insure full flow of power into the bar. This distinguishes the present invention from other types of connections wherein the contact is of relatively small area and in which there is a possibility of some portions of the connection having imperfect contact with the bar with consequently inefficient operation.

I claim:

1. A terminal block for a trolley system which includes a conductor bar having a cross section of substantially 8 shape, comprising a connector for connecting a power cable to said bar in axial relation with said bar, said connector comprising conducting clamping blocks to engage opposite sides of said bar and a cable clamp having its ends secured directly to both blocks for clamping the cable against said blocks, and means for forcing the blocks into engagement with said bar, the inner faces of the blocks which engage the bar having grooves therein extending longitudinally thereof throughout the length of the blocks, said grooves being shaped to conform to the shape of the bar, portions of said meeting faces of said blocks having arcuate, longitudinally extending grooves parallel with said first grooves which, when the blocks are clamped to opposite sides of the conductor bar, form a semi-circular groove in said blocks into which the cable is forced by said cable clamp.

2. A terminal block as defined in claim 1 in which said cable clamp has horizontally extending ears projecting from opposite sides thereof, and provided with open-ended slots, and bolts passing through said slots and threaded into openings in said blocks.

3. A terminal block as defined in claim 1 in which said cable clamp has at its opposite ends and on opposite sides of the cable, downwardly projecting portions overlying the ends of the blocks to prevent longitudinal movement of the clamp relative to said blocks.

4. A terminal block as defined in claim 1 in which the means for forcing the blocks into engagement with the bar comprises bolts at opposite ends of the blocks and extending from opposite sides thereof, said bolts passing freely through one block and the conductor bar and being threaded into openings in the other block.

References Cited in the file of this patent

UNITED STATES PATENTS

| | | |
|---|---|---|
| 864,930 | Siegfried | Sept. 3, 1907 |
| 1,967,014 | Taverner | July 17, 1934 |
| 1,997,627 | Casey | Apr. 16, 1935 |
| 2,221,158 | Tuoro et al. | Nov. 12, 1940 |
| 2,287,761 | Matthysse | June 23, 1942 |
| 2,309,607 | Rogoff | Jan. 26, 1943 |
| 2,596,022 | Genter | May 6, 1952 |
| 2,651,767 | Bergan | Sept. 8, 1953 |
| 2,657,284 | McGlothlen | Oct. 27, 1953 |